No. 676,609. Patented June 18, 1901.
I. H. JONES.
BAKING PAN.
(Application filed Jan. 15, 1901.)
(No Model.) 2 Sheets—Sheet 1.
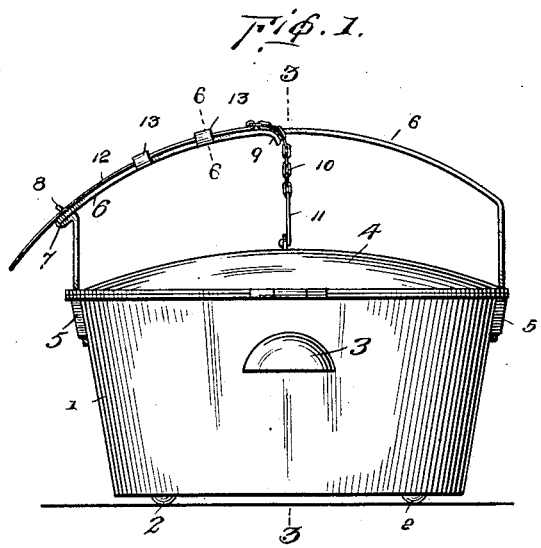
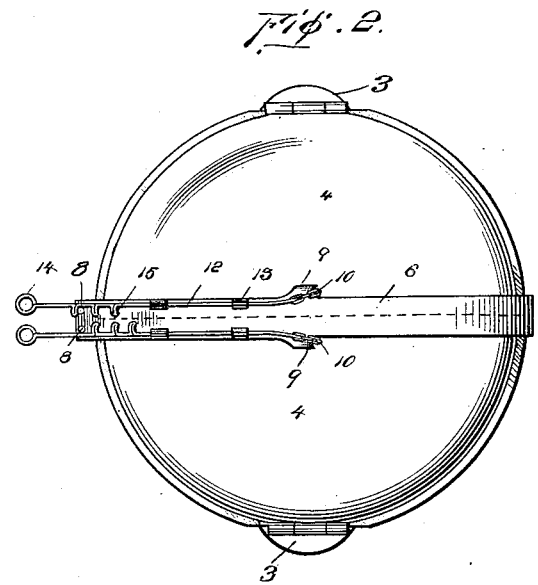
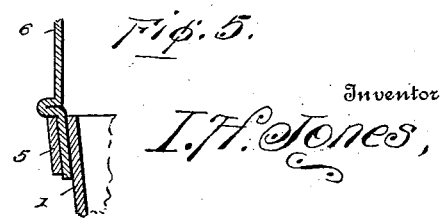
Witnesses
F. W. Riley,
Herbert D. Lawson
Inventor
I. H. Jones,
By Victor J. Evans. Attorney
THE NORRIS PETERS CO., PHOTO-LITHO., WASHINGTON, D. C.

No. 676,609. Patented June 18, 1901.
I. H. JONES.
BAKING PAN.
(Application filed Jan. 15, 1901.)
(No Model.) 2 Sheets—Sheet 2.
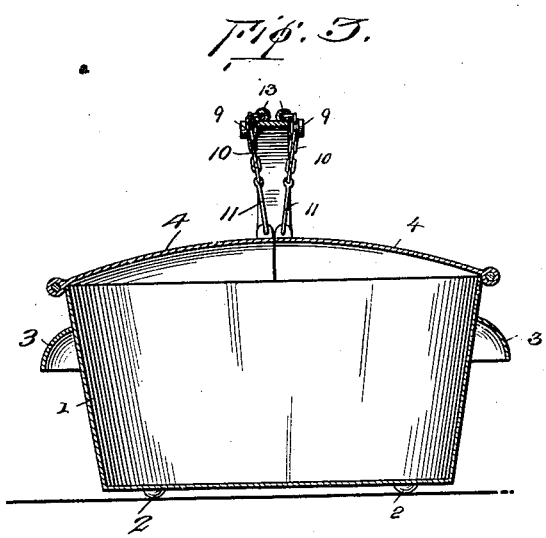
Fig. 5.
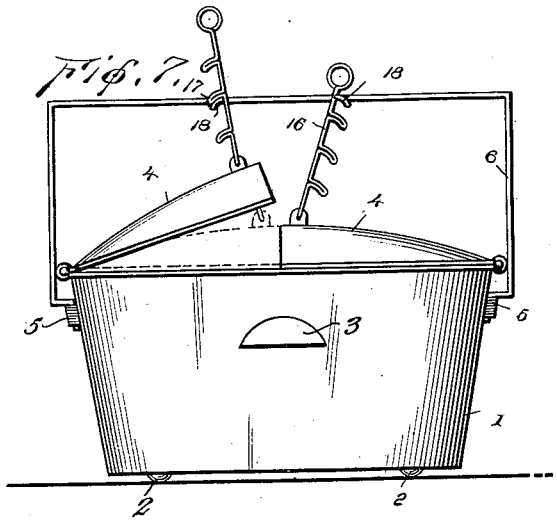
Fig. 7.
Fig. 6.
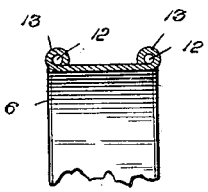
Inventor
I. H. Jones,
By Victor J. Evans, Attorney
Witnesses

United States Patent Office.

ISABELLA HUMPHREYS JONES, OF SALISBURY, MARYLAND.

BAKING-PAN.

SPECIFICATION forming part of Letters Patent No. 676,609, dated June 18, 1901.

Application filed January 15, 1901. Serial No. 43,433. (No model.)

*To all whom it may concern:*

Be it known that I, ISABELLA HUMPHREYS JONES, a citizen of the United States, residing at Salisbury, in the county of Wicomico and State of Maryland, have invented new and useful Improvements in Baking-Pans, of which the following is a specification.

This invention relates to new and useful improvements in baking-pans; and its primary object is to provide a device of this character which is so constructed as to prevent burning of the dough placed therein.

With this and other objects in view the invention consists in providing a pan with a cover formed of two hinged sections adapted to open outward from each other. A bail-shaped frame extends over the cover, and mounted thereon are means of peculiar construction for raising the sections of the cover independently of each other and supporting them in such position.

The invention also consists in the novel construction and combination of parts hereinafter more fully described and claimed, and illustrated in the accompanying drawings, showing the preferred form of my invention, and in which—

Figure 1 is an elevation of the device closed. Fig. 2 is a plan view thereof. Fig. 3 is a vertical section on line 3 3, Fig. 1. Fig. 4 is an enlarged section through a portion of the bail-shaped frame. Fig. 5 is a similar view of one end of said bail-shaped frame and its socket. Fig. 6 is a transverse section on line 6 6, Fig. 1; and Fig. 7 is an elevation of a modified form of bail-shaped frame.

Referring to the figures of the drawings by numerals of reference, 1 is a pan formed of any suitable material and preferably mounted upon feet 2, of desired form. Ears 3 may be provided, whereby the pan can be easily lifted, and a cover formed of semicircular sections 4 is arranged upon the pan. These sections are hinged to opposite sides of the pan, respectively, and are held normally closed by gravity.

Sockets 5 are secured upon the pan at opposite sides thereof, and these sockets receive the ends of a bail-shaped frame 6, which arches over the pan. The bail-shaped frame is bent upon itself at one side thereof, as at 7, and studs 8 extend therefrom at this point and are for the purpose hereinafter more fully described.

Downwardly-curved and channeled tongues 9 are arranged at opposite sides of the bail-shaped frame at the center thereof, and chains 10 are mounted thereon and extend downward to rods 11, which are secured to the inner edges of the sections 4. Secured to the remaining end of each chain 10 is a sliding rod 12, which is mounted in ears 13, formed at the side of the bail-shaped frame 6. A loop or handle 14 is formed at the free end of each rod 12, and inwardly-extending hooks 15 are also formed therewith, and each hook is adapted to be sprung into engagement with one of the studs 8. It will thus be seen that by sliding the rods 12 backward and placing them into engagement with the studs 8 either or both of the sections 4 will be supported in raised position.

In Fig. 7 is shown a modified form of my invention in which the sliding rods 12 are dispensed with and hooked rods 16 employed in lieu thereof. These rods are secured to the sections 4, and the hooks 17 thereof are adapted to be placed in engagement with lateral extensions 18 upon the top of the bail-shaped frame.

By hinging a cover to the baking-pan, as herein described, the amount of heat within the pan may be regulated and the dough kept from burning. This construction also obviates the necessity of placing a pan over the dough, as has been done heretofore to prevent burning. By employing ears in connection with the baking-pan the said pan may be readily moved from place to place, and, moreover, by employing supports or feet under the pan the air is permitted to freely circulate thereunder, and the dough is thereby prevented from burning.

In the foregoing description I have shown the preferred form of my invention; but I do not limit myself thereto, as I am aware that modifications may be made therein without departing from the spirit or sacrificing any of the advantages thereof; and I therefore reserve the right to make all such changes as fairly fall within the scope of my invention.

Having thus fully described my invention, what I claim as new, and desire to secure by Letters Patent, is—

1. The combination with a pan; of a cover hinged thereto; a bail-shaped frame extending over the cover, and means whereby the cover may be suspended in open position from the bail-shaped frame.

2. The combination with a pan; of a cover hinged thereto; a rod secured to the cover; a bail-shaped frame, and means for suspending the rod and cover from the bail-shaped frame.

3. The combination with a pan; of a cover formed of oppositely-hinged sections secured thereto; a bail-shaped frame, and means for supporting either of the sections from the bail-shaped frame.

4. The combination with a pan; of a cover formed of oppositely-hinged sections secured thereto; a bail-shaped frame; rods slidably mounted upon the bail-shaped frame, and a flexible connection between the rods and a cover-section.

5. The combination with a pan; of a cover hinged thereto; a bail-shaped frame; a rod slidably mounted upon the bail-shaped frame; a flexible connection between the rod and cover, and means for preventing movement of the rod upon the bail-shaped frame.

6. The combination with a pan; of a cover hinged thereto; a bail-shaped frame; a tongue on the bail-shaped frame; a rod slidably mounted upon said bail-shaped frame; a flexible connection between the rod and cover, and upon the tongue; hooks on the rod, and a stud upon the bail-shaped frame adapted to be engaged by one of the hooks.

In testimony whereof I affix my signature in presence of two witnesses.

ISABELLA HUMPHREYS JONES.

Witnesses:
W. S. GORDY, Jr.,
JNO. H. WHITE.